Patented Feb. 6, 1945

2,368,807

UNITED STATES PATENT OFFICE 2,368,807

RUBBER COMPOUNDING

Arthur B. Cowdery, Harwich Port, Mass., assignor to Allied Chemical & Dye Corporation, New York, N. Y., a corporation of New York No Drawing. Application February 14, 1942, Serial No. 430,947

6 Claims. (Cl. 106—269)

This invention pertains to improvements in materials for use in rubber compounding and particularly to a new composition of matter for use in rubber compounding and to a method of employing such composition.

As is well known, carbon is used in many forms in compounding rubber, e. g., as carbon black and pitch, and serves both to fill and to increase the strength of the vulcanized rubber products. The pitches also serve as softeners for the rubber. My prior United States Patent No. 1,820,444 discloses a particularly valuable hard pitch product for use in rubber compounding obtained by distilling coal tar having a free carbon content of at least 20 per cent until 25 to 30 per cent of the volatile matter has been removed to produce a pitch residue containing 40 per cent or more of free carbon. My Patent No. 2,052,607 discloses blending with the product of Patent No. 1,820,444 from 2 to 10 per cent of a high molecular weight aliphatic softening agent such as stearic acid to reduce the tendency of the pitch to scatter or fly from the rubber during incorporation therein. While these materials have been highly satisfactory for most rubber compounding processes in which the rubber mixing rolls are maintained at a temperature of 150° F. or higher, it is necessary to maintain materially lower compounding temperatures in the neighborhood of 110° to 120° F. for compounding certain rubber stocks, e. g., fast curing stocks having a pronounced tendency to scorch and stocks containing relatively large proportions of the softer grades of reclaimed rubber. It has been found that in compounding such stocks, maintenance of working temperatures sufficiently high to disperse the pitch compounding materials in the rubber either softens the rubber too much for satisfactory compounding or scorches the stock, while lowering of the working temperature sufficiently to avoid these difficulties prevents satisfactory dispersion of the pitch compounding material in the rubber stock.

It is an object of this invention to produce a novel rubber compounding material of improved milling characteristics which overcomes the disadvantages hereinabove referred to.

It is a further object of the invention to produce a novel rubber compounding material involving a hard pitch base of high free carbon content which may be readily dispersed thoroughly and completely in rubber mixes requiring maintenance of relatively low temperatures during the compounding operation.

It is another object of the invention to provide a novel process of compounding rubber employing a pitch-base compounding material, utilizing lower temperatures and shorter times for compounding than have heretofore been feasible when compounding materials involving similar pitch bases were employed. Other objects and advantages will appear hereinafter.

In accordance with the invention coal tar pitch or water gas tar pitch of a softening point of from 200° to 250° F. (Ring and Ball) and of high free carbon content is blended with a small amount of high molecular weight aliphatic softening agent of a lubricating or waxy nature and a small amount of an aromatic oil boiling substantially within the range of 220° to 300° C. in proportion such that the resultant blend has a softening point of from about 165° to 195° F. Preferably these materials are blended in proportions of from 90 to 93 per cent by weight of pitch of a softening point of from 225° to 235° F., from 2 to 8 per cent of high molecular weight aliphatic material of lubricating or waxy nature, and from 2 to 5 per cent of coal tar carbolic oil fraction comprising predominantly monomethyl and dimethyl naphthalenes.

I have found that materially lower temperatures and shorter times are required for homogeneously dispersing the compounding material of the invention in rubber mixes than were necessary for effecting dispersion of compounding materials having similar hard pitch bases of high free carbon content heretofore employed. Thus incorporation of my improved pitch-base compounding material may be readily accomplished at temperatures in the neighborhood of 110°–120° F. as compared with temperatures of 150° F. or higher necessary for dispersing prior compounding materials involving similar pitch bases. Hence, my improved compounding material may be employed to special advantage in rubber mixes which do not withstand compounding temperatures of 150° F. or higher and in which the prior art pitch-base compounding materials could not be satisfactorily employed, e. g., fast curing mixes which scorch objectionably at temperatures of 150° F. or higher and mixes containing relatively high proportions of reclaimed rubber, particularly of the softer types. Furthermore, use of my improved compounding material results in rubber mixes of improved plasticity and processing properties, reduces power costs necessary for compounding the rubber and results in vulcanized products having properties that compare favorably with the properties of products compounded with other pitch-base compounding materials. The above advantages are obtained to optimum extent when the preferred oils comprising predominantly monomethyl and dimethyl naphthalenes are employed as the oil constituent of the compounding material.

The predominating pitch base constituent of my compounding material is prepared by distilling coal tar, e. g., gas house tar and mixtures thereof with coke oven tar, or water gas tar until sufficient volatile matter has been removed to obtain a pitch residue of a softening point of 200° to 250° F. (Ring and Ball). The coal tar pitch base should contain at least 38 per cent of free carbon, i. e., constituents formed in situ and insoluble in hot benzene or toluene; such pitch may be obtained by distillation of coal tar containing at least about 19 per cent of free carbon. Water gas tar pitch contains less free carbon than coal tar pitch of similar melting point; where water gas tar pitch is employed as the pitch base constituent the pitch should have a free carbon content of at least 22 per cent. Such pitches are referred to herein as of high free carbon content. Pitches prepared as disclosed in my prior Patent No. 1,820,444 having a softening point of from 225° to 235° F. are suitable for use as the pitch base of my improved compounding material.

As aliphatic high molecular weight softening agent of lubricating or waxy nature, the higher fatty acids such as oleic and other similar acids, preferably stearic acid, or their derivatives, as well as Montan wax and other allied waxes may be employed. Other such agents that may be mentioned include high boiling paraffins, e. g., paraffin, ceresin and petrolatum, a large number of the higher alcohols and their derivatives, and fatty oils, e. g., palm oil.

The aromatic oil constituent of my rubber compounding material is preferably derived by treating the first 15 to 20 per cent of the distillate obtained during the distillation of crude coal tar, known in the art as carbolic oil, with sulfuric acid and alkali in a well known manner to remove tar bases and tar acids. The oil is then cooled, settled and filtered to remove material crystalline at 10° C. and the resultant oil distilled and a fraction boiling between about 220° C. and about 300° C. recovered. The preferred oils have the following properties:

| | |
|---|---|
| Specific gravity at 15.5° C | 1.00–1.06 |
| Distillation: | |
| To 225° C Per cent | Not over 5 |
| To 250° C do | 30–70 |
| To 280° C (minimum) do | 80 |
| Dry ° C | Not above 325 |
| Tar acids ° C | Not over .3 |
| Tar bases ° C | Not over .3 |
| Free from crystalline material (limpid point) ° C | Not above 10 |

Coal tar distillate oils comprising predominantly monomethyl and dimethyl naphthalene fractions substantially free from naphthalene, having the above properties may be utilized with especial advantage; such oils are disclosed in Engel Patent No. 2,153,141.

As an example of preferred rubber compounding compositions prepared in accordance with the invention, a coal tar pitch base, derived from gas house tar or a mixture thereof with coke oven tar, having a softening point (Ring and Ball) of from 225° to 235° F. and a free carbon content of from 42.5 to 46 per cent is thoroughly mixed while in molten condition with from 2 to 8, e. g., 5 per cent by weight of stearic acid and the mixture stirred in a suitable mixer until a uniform blend having a softening point (Ring and Ball) of 205° to 215° F. and a free carbon content of 40 to 44 per cent is obtained. This blend is then cooled to 250° to 300° F. after which from about 2 to 5, e. g., 3 per cent by weight of the coal tar distillate oil hereinabove described is added and the mixture mechanically agitated until thoroughly homogeneous. The resultant product has a softening point (Ring and Ball) of 175° to 185° F. and a free carbon content of 38 to 43 per cent. A suitable composition of a softening point of 178° F. and a free carbon content of 39.4 per cent may be produced by blending in the manner hereinabove described 91.9 parts by weight of the coal tar pitch base of a softening point of 234° F. and a free carbon content of 42.8 per cent, 5.0 parts by weight of stearic acid and 3.1 parts by weight of coal tar distillate oil having a specific gravity of 1.02, a boiling range of 225° to 280° C., free from crystalline material at 10° C. and constituted predominantly of monomethyl and dimethyl naphthalene fractions. Other products having a softening point of from 165° to 195° F. and a free carbon content of at least about 35 per cent may be made by blending coal tar pitch having a softening point of from 200° to 250° F. and a free carbon content of at least about 38 per cent with from 2 to 8 per cent by weight of high molecular weight aliphatic softening agent such as stearic acid, and from 2 to 5 per cent of aromatic oil boiling substantially within the range of 220° to 300° C. Where water gas tar pitch of a free carbon content of at least 22 per cent is employed as the pitch constituent of such blend, the free carbon content of the blend will be at least about 20 per cent.

The following examples are illustrative of the use of my composition in rubber compounding:

*Example I*

A batch of 125 parts by weight of reclaimed rubber and 25 parts by weight of smoked sheet rubber were milled for four minutes at a temperature of 140° to 150° F. on a rubber mill having rolls 6 inches in diameter. After cooling, the batch was milled for two minutes between rolls maintained at a temperature of 110° to 120° F. and milling was then continued while 50 parts by weight of pitch-base compounding material of a softening point of 178° F. constituted of 92.1 per cent by weight of coal tar pitch, 4.9 per cent of stearic acid and 3 per cent of coal tar distillate oil prepared as hereinabove described were added. It was found that the pitch base compounding material was dispersed thoroughly and completely through the rubber producing a homogeneous blend therewith within two minutes after the material was added to the rubber.

For purposes of comparison, the procedure described in Example I was twice repeated using the same rubber mill and similar materials except that instead of the compounding material utilized in Example I, the following compounding materials were employed, respectively:

(A) 50 parts by weight of a mixture of the pitch base of the compounding material of the example and 5 per cent by weight of stearic acid.

(B) 48.5 parts by weight of a mixture of the pitch base of the example with 5 per cent by weight of stearic acid; 1.5 parts by weight of the coal tar oil constituent of the compounding material of Example I were added separately after dispersion in the rubber of the pitch-stearic acid blend; the oil was added after the pitch-stearic acid had been dispersed, since, if it had been added before, the rubber would have become too soft for satisfactory compounding. It will be observed that same ingredients were employed in mix (B) as in Example I, but the pitch-stearic acid mixture and the coal tar oil were added separately in (B) instead of being blended before addition to the rubber as in Example I.

It was found that these compounding materials could not be dispersed in the rubber employing mill roll temperatures of 110° to 120° F.; the minimum mill roll temperatures and time required for effecting dispersion and the plasticity of the resultant rubber stock after dispersion were then determined and are tabulated below. The plasticity values given were determined by the Mooney Shear Disk Plastometer at a temperature of 100° C. for a shearing period of three minutes.

| Identification | Compounding material (parts by weight) | Mill roll temperature required for dispersion, °F. | Time required for dispersion, minutes | Plasticity of rubber stock after dispersion of compounding materials |
|---|---|---|---|---|
| Example I | 50 parts of compounding material of Example I | 110–120 | 2 | 22.5 |
| (A) | 50 parts of pitch-stearic acid mixture | 150–155 | 3½ | 24.5 |
| (B) | 48.5 parts of pitch-stearic acid mixture followed by addition of 1.5 parts of oil. | 150–155 | 4½ | 24 |

It will be observed that materially lower mill roll temperatures and less time were required to completely disperse the rubber compounding material employed in Example I than the compounding materials utilized in mixes (A) and (B). Furthermore, the compounding material employed in Example I imparted somewhat greater plasticity to the rubber than those employed in mixes (A) and (B), thus promoting easier working of the rubber with reduced power costs. It will be noted particularly that since the mix of Example I and mix (B) involved the same amounts of the same basic ingredients (rubber, pitch, stearic acid and coal tar oil), the improved results obtained in Example I cannot be regarded as merely the additive effect of the ingredients of the compounding material but that use of a blend of the ingredients produces positive advantages not obtained by employing the ingredients separately.

Example II 500 parts by weight of smoked sheet rubber were milled on a rubber mill at a mill roll temperature of 110° to 120° F. for two minutes and 250 parts by weight of the compounding material employed in Example I were added and milling was continued at a same roll temperature until the compounding material was completely dispersed in the rubber. Complete dispersion was effected within 2½ minutes after addition of the compounding material. It was found that a materially longer time and higher temperature were necessary to completely disperse a like amount of compounding material of the same softening point (178° F.), made by blending similar pitch base with stearic acid, in 500 parts of similar smoked sheet rubber.

Examples III and IV

The following are illustrative of compositions suitable for the manufacture of inner tube and soling stocks, parts being by weight:

| | Example III inner tube stock | Example IV soling stock |
|---|---|---|
| Rubber (smoked sheets) | 100 | 100 |
| Compounding material | 13 | 50 |
| Paracoumarone resin (melting point about 180° F.) | 3 | |
| Channel black | | 80 |
| Soft carbon black | 33 | |
| Zinc oxide | 5.5 | 5 |
| Stearic acid | 1 | |
| Anti-oxidant (phenyl B-naphthylamine) | | 1 |
| Anti-oxidant (ketone-amine reaction product) | 1 | |
| Litharge | .25 | |
| Sulfur | 2 | 3.25 |
| Diorthotolylguanidine | | 1.75 |
| Tetramethyl thiuram monosulfide | .25 | |
| Total | 159 | 241 |

The rubber compounding material was similar to that employed in Examples I and II. The above ingredients were assembled and milled in the customary manner; the milled stocks were subjected to plasticity tests and batches of the milled inner tube stock were cured at 287° F. corresponding to a steam pressure (gauge) of about 40 pounds per square inch for 5, 7½, 10, 12½ and 15 minutes, respectively; batches of the soling stock were vulcanized at 316° F. corresponding to a steam pressure (gauge) of 70 pounds per square inch for 5, 10 and 15 minutes, respectively. The vulcanized products were subjected to tear resistance, bloom, hardness and tensile tests, and were found to possess satisfactory properties; the soling stocks were additionally subjected to abrasion resistance and flexing tests. The results of the tests showed that the properties of vulcanized products compared favorably with those of vulcanized stocks made by similarly vulcanizing mixes differing therefrom only in that they contained like amounts of other pitch-base softeners such as pitch-stearic acid mixtures.

Thus it will be seen I have provided an improved pitch-base rubber compounding material which may be incorporated in rubber employing conventional compounding equipment such as rubber mills of the roll type and internal mixers of the Banbury type at materially lower temperatures and in a substantially shorter time than prior compounding materials involving similar pitch bases. Use of the compounding material of the invention results in rubber mixes of improved plasticity and processing properties, reduces power costs necessary for compounding the rubber and results in vulcanized products of satisfactory tensile and other properties. Furthermore, as appears from the foregoing examples, the advantages flowing from use of the improved compounding material cannot be obtained by employing the ingredients of the material separately and hence the material produces results which are more than the additive effect of its ingredients.

While I prefer to use the coal tar distillate, hereinabove described, as the aromatic oil constituent of my rubber compounding material, suitable oils, i. e., those containing at least 80 per cent by weight of aromatic hydrocarbons and boiling substantially within the range of from 220° to 300° C., may be obtained in the distillation of water gas tar to produce pitch, in the distillation of drip oil and in the solvent extraction of petroleum. In short, any aromatic hydrocarbon or mixture of such hydrocarbons boiling in the range of 220° to 300° C., derived from natural sources or produced synthetically, may be employed as the aromatic oil constituent of my invention. For the purposes of this invention, the aromatic hydrocarbon content of the oil may be determined by measuring the sulfonatable content of the oil.

Since certain changes may be made without departing from the scope of the invention, it is intended that the above shall be interpreted as illustrative and not in a limiting sense.

What is claimed is:

1. A pitch base rubber compounding material dispersible in rubber at temperatures below 150° F., comprising a substantially homogeneous blend of from 90 to 93 per cent by weight of pitch of a softening point of 200° to 250° C. of the class consisting of coal tar pitch and water gas tar pitch, from 2 to 8 per cent by weight of a high molecular weight aliphatic softening agent and from 2 to 5 per cent by weight of aromatic oil boiling substantially within the range of from 220° to 300° C., said compounding material having a softening point from 165° to 195° F.

2. A pitch base rubber compounding material readily dispersible in rubber at temperatures below about 150° F. comprising a substantially homogeneous blend of from 90 to 93 per cent by weight of coal tar pitch having a softening point of from 200° to 250° F. and a free carbon content of at least 38 per cent, from 2 to 8 per cent by weight of stearic acid and from 2 to 5 per cent by weight of aromatic oil boiling substantially within the range of 220° to 300° C., said oil being free of crystalline material at 10° C., said blend having a softening point of from 165° to 195° F. and a free carbon content of at least about 35 per cent.

3. A pitch base rubber compounding material readily dispersible in rubber at temperatures below about 150° F. comprising a substantially homogeneous blend of from 90 to 93 per cent by weight of water gas tar pitch having a softening point of from 200° to 250° F. and a free carbon content of at least about 22 per cent, from 2 to 8 per cent by weight of stearic acid and from 2 to 5 per cent by weight of aromatic oil boiling substantially within the range of 220° to 300° C., said oil being free of crystalline material at 10° C., said blend having a softening point of from 165° to 195° F., and a free carbon content of at least about 20 per cent.

4. A rubber compounding material readily dispersible in rubber at temperatures below about 150° F. comprising a substantially homogeneous blend of from 90 to 93 per cent by weight of coal tar pitch of a softening point of from 225° to 235° F. and a free carbon content of at least 42.5 per cent, from 2 to 8 per cent by weight of stearic acid and from 2 to 5 per cent by weight of aromatic oil boiling substantially within the range of from 220° to 300° C., said blend having a softening point of from 175° to 185° F., and containing at least about 38 per cent of free carbon.

5. A pitch base rubber compounding material readily dispersible in rubber at temperatures below about 150° F. comprising a substantially homogeneous blend of from 90 to 93 per cent by weight of coal tar pitch of a softening point of from 225° to 235° F., and a free carbon content of at least 42.5 per cent, from 2 to 8 per cent by weight of stearic acid and from 2 to 5 per cent by weight of coal tar distillate oil boiling substantially within the range of from 220° to 300° C. having a specific gravity of from 1.00 to 1.06 at 15.5° C., substantially free from tar acids and tar bases and from crystalline material at 10° C., and comprising predominantly monomethyl and dimethyl naphthalene fractions, said blend having a softening point of from 175° to 185° F. and containing at least 38 per cent of free carbon.

6. A rubber compounding material readily dispersible in rubber at temperatures below about 150° F. comprising a substantially homogeneous blend of about 92 per cent by weight of pitch of the class consisting of coal tar pitch and water gas tar pitch, about 5 per cent by weight of stearic acid and about 3 per cent by weight of coal tar oil boiling substantially within the range of from 220° to 300° C., said blend having a softening point of from 175° to 185° F.

ARTHUR B. COWDERY.

CERTIFICATE OF CORRECTION.

Patent No. 2,368,807. February 6, 1945.

ARTHUR B. COWDERY.

It is hereby certified that error appears in the printed specification of the above numbered patent requiring correction as follows: Page 2, first column, line 3-4, for "compirsing" read --comprising--; line 18, for "19 per cent" read --18 per cent--; lines 60 and 61 respectively, for "° C" read --Per cent--; page 3, first column, line 37, for "dispense" read --disperse--; and that the said Letters Patent should be read with this correction therein that the same may conform to the record of the case in the Patent Office.

Signed and sealed this 29th day of May, A. D. 1945.

(Seal)

Leslie Frazer
Acting Commissioner of Patents.